US011097580B2

(12) United States Patent
Niedert et al.

(10) Patent No.: US 11,097,580 B2
(45) Date of Patent: Aug. 24, 2021

(54) METHODS AND APPARATUS FOR A MODULAR DOUBLE PIN LOAD SENSOR COUPLED TO A HITCH RECEIVER

(71) Applicant: Ford Global Technologies, LLC, Dearborn, MI (US)

(72) Inventors: Andrew Niedert, New Hudson, MI (US); Christopher Eric Allard, Canton, MI (US); Peter Simeon Lazarevski, Dearborn, MI (US); Kevin Stanton Giaier, Sylvan Lake, MI (US); Chad Reed, Southfield, MI (US); Johannes Gießibl, Amerang (DE)

(73) Assignees: Ford Global Technologies, LLC, Dearborn, MI (US); Methode Electronics, Inc., Chicago, IL (US)

( * ) Notice: Subject to any disclaimer, the term of this patent is extended or adjusted under 35 U.S.C. 154(b) by 118 days.

(21) Appl. No.: 16/230,776

(22) Filed: Dec. 21, 2018

(65) Prior Publication Data
US 2020/0198422 A1 Jun. 25, 2020

(51) Int. Cl.
*B60D 1/36* (2006.01)
*B60D 1/01* (2006.01)
*B60D 1/62* (2006.01)

(52) U.S. Cl.
CPC ............ *B60D 1/36* (2013.01); *B60D 1/01* (2013.01); *B60D 1/62* (2013.01)

(58) Field of Classification Search
CPC ... B60D 1/36; B60D 1/01; B60D 1/62; B60D 1/065; B60D 1/248; B60D 1/485
USPC .................................................. 280/446.1
See application file for complete search history.

(56) References Cited

U.S. PATENT DOCUMENTS

| | | | |
|---|---|---|---|
| 5,511,812 | A | 4/1996 | Milner |
| 8,380,390 | B2 | 2/2013 | Sy et al. |
| 9,056,535 | B2 | 6/2015 | Materna et al. |
| 9,464,953 | B2 | 10/2016 | Wirthlin |
| 9,643,462 | B2 | 5/2017 | McAllister |
| 9,981,512 | B2 | 5/2018 | Gentner |
| 10,670,479 | B2 | 6/2020 | Reed et al. |
| 2013/0253814 | A1 | 9/2013 | Wirthlin |
| 2014/0360282 | A1 | 12/2014 | Giessibl |
| 2015/0137482 | A1 | 5/2015 | Woolf et al. |
| 2016/0185170 | A1 | 6/2016 | McAllister |
| 2016/0231165 | A1 | 8/2016 | Fredrickson |

(Continued)

FOREIGN PATENT DOCUMENTS

| | | |
|---|---|---|
| CN | 104280165 | 1/2015 |
| DE | 102014217801 | 3/2016 |

(Continued)

OTHER PUBLICATIONS

Wirthlin, "Intelligent Hitch for Measuring Both Trailer Weight and Tongue Weight," Jun. 26, 2015, 5 pages.

*Primary Examiner* — Minnah L Seoh
*Assistant Examiner* — Sophia Marie McGuire
(74) *Attorney, Agent, or Firm* — Ray Coppiellie; Hanley, Flight & Zimmerman, LLC

(57) ABSTRACT

Methods, apparatus, systems and articles of manufacture are disclosed for a modular double pin load sensor coupled to a hitch receiver. An example disclosed apparatus to be coupled to a receiver tube includes a crossbar interface to be coupled to a crossbar of a hitch, a pin adapter coupled to the crossbar interface, a first load-sensing pin disposed within the pin adapter, and a second load-sensing pin disposed within the pin adapter.

20 Claims, 12 Drawing Sheets

(56) References Cited

U.S. PATENT DOCUMENTS

| | | |
|---|---|---|
| 2019/0143769 A1 | 5/2019 | Niedert et al. |
| 2019/0263204 A1 | 8/2019 | Reed et al. |
| 2019/0265112 A1 | 8/2019 | Reed et al. |
| 2019/0344631 A1 | 11/2019 | Giessibl |
| 2020/0041362 A1 | 2/2020 | Reed et al. |
| 2020/0240853 A1 | 7/2020 | Reed et al. |

FOREIGN PATENT DOCUMENTS

| | | |
|---|---|---|
| DE | 102014217801 A1 | 3/2016 |
| EP | 2363307 B1 | 9/2011 |
| WO | 2018171937 A1 | 9/2018 |

METHODS AND APPARATUS FOR A MODULAR DOUBLE PIN LOAD SENSOR COUPLED TO A HITCH RECEIVER

FIELD OF THE DISCLOSURE

This disclosure relates generally to vehicle hitches and, more particularly, to methods and apparatus for a modular double pin load sensor coupled to a hitch receiver.

BACKGROUND

In recent years, consumer vehicles capable of pulling trailers have implemented additional data processing capabilities. With these capabilities, vehicles can process parameters of a vehicle and/or trailer not previously processed to provide additional insights to a user of the vehicle. For example, an additional parameter of the vehicle that can be processed is the load condition experienced at a hitch. The load condition includes various characteristics (e.g., weight, load orientation, braking force, etc.) experienced by the hitch.

Different vehicle models often have different configurations, including spare tire placement, fuel tank placement, floor board height, frame rail spacing, etc. As a result, the hitch design may vary significantly between model types. Regardless of the specific model of a vehicle, vehicle hitches generally include a receiver tube and a crossbar. The receiver tube of a hitch is used to couple a towing element (e.g., a hitch ball, a drawbar, etc.) to the vehicle and often has a square cross-section. A crossbar is a tube connecting the driver and passenger sides of a vehicle to the receiver tube. Crossbars often have simple geometric cross-sections, such as a circle or a square.

BRIEF DESCRIPTION OF THE DRAWINGS

The figures are not to scale. Instead, the thickness of the layers or regions may be enlarged in the drawings. In general, the same reference numbers will be used throughout the drawing(s) and accompanying written description to refer to the same or like parts.

DETAILED DESCRIPTION

Many vehicle hitch designs are specific to individual vehicle models and, thus, can require the hitch to have unique shapes and parts specific to each vehicle model. Variations in hitch design between vehicle models can be attributed to the shape of the rear bumper housing, packaging requirements for the spare tire, floor board height, frame rail spacing, etc. These variations in hitch design can make it difficult to package force-sensing elements (e.g., pins, strain gauge, etc.) into a hitch. For example, each hitch design can require specifically designed force-sensing elements, which can increase manufacturing cost and reduce availability of replacement parts.

In some examples disclosed herein, load-sensing pins are used to determine the load condition of a trailer on a vehicle. Other load-sensing elements such as pressure sensors, piezoelectric sensors, etc. are specifically tailored to the hitch (e.g., the hitch ball diameter, etc.) or the interaction between the vehicle and the trailer (e.g., ride height differences between the vehicle and trailer, etc.). Because hitch ball and/or drawbar diameter varies with the coupled trailer, use of pressure sensors and piezoelectric sensors may not be practical. Accordingly, the examples disclosed herein include load-sensing pins that can be implemented on any vehicle and trailer configuration.

Examples disclosed herein address the above-noted problems by determining one or more load characteristics at the trailer hitch receiver with two load-sensing pins disposed within a pin adapter coupled to a receiver tube. In some examples disclosed herein, the housing is coupled to a crossbar via a housing. In some examples disclosed herein, the pin adapter is shaped such that the pin adapter does not contact a horizontal surface of the first load-sensing pin. In some examples disclosed herein, the first load-sensing pin and the second load-sensing pin are at substantially the same vertical position relative to the crossbar. In some examples disclosed herein, a load manager analyzes the outputs of the first load-sensing pin and the second load-sensing pin and presents a load condition to a user.

In some examples disclosed herein, the housing, the crossbar and/or load manager can include various configurations that may depend on a type of vehicle model and/or trailer coupled to the vehicle. In some examples disclosed herein, the configurations of the housing, the crossbar and/or load manager can be altered to minimize the packaging space of the load-sensing pins.

Figure 1:
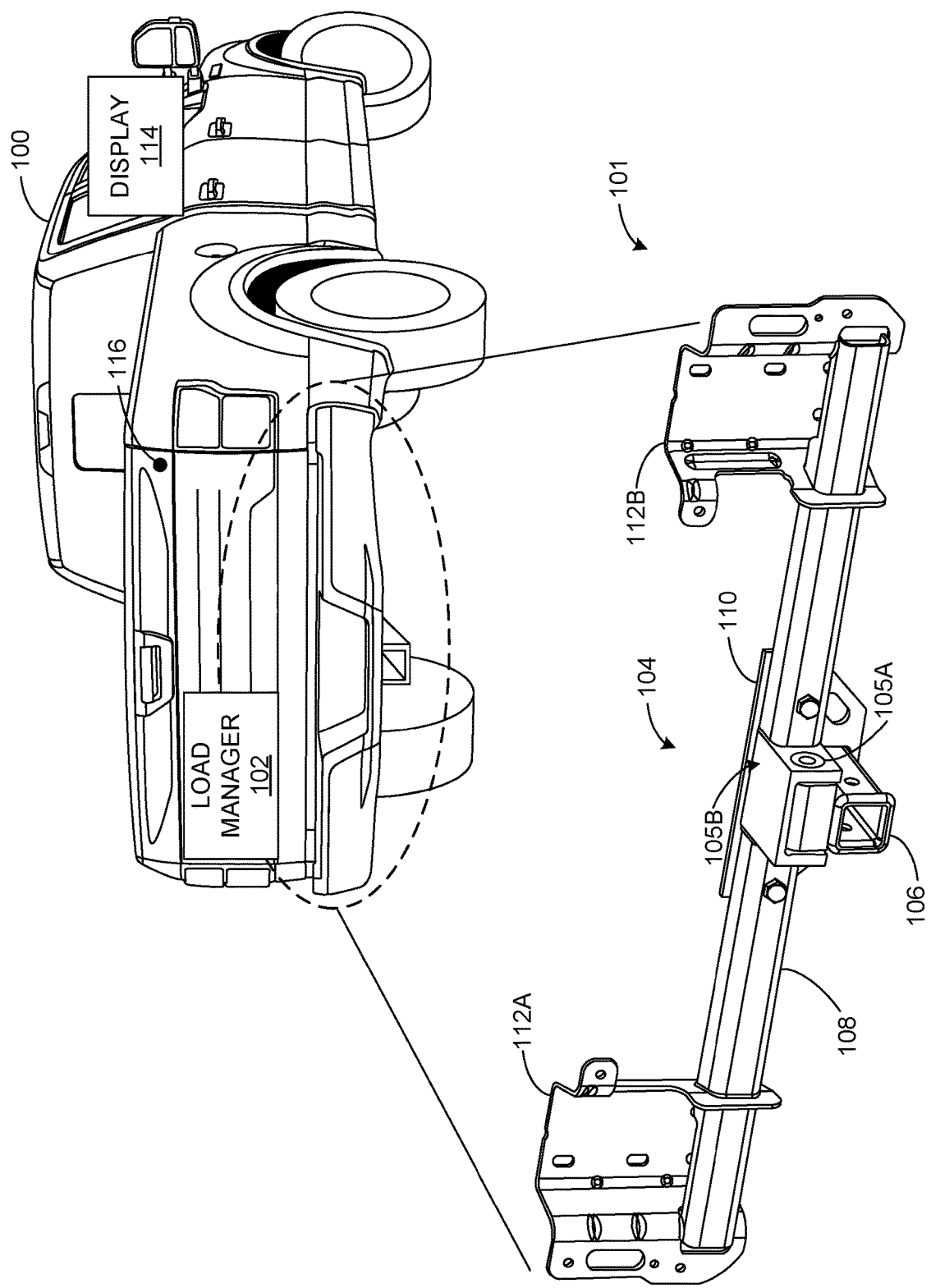
FIG. 1 illustrates an example vehicle including a hitch pin load manager and a pin adapter including load-sensing pins by which the examples disclosed herein may be implemented.

FIG. 1 illustrates an example vehicle 100 including an example load manager 102 and an example hitch 101. The example hitch 101 includes an example housing 104 that includes an example first load-sensing pin 105A and an example second load-sensing pin 105B by which the examples disclosed herein may be implemented. In the illustrated example of FIG. 1, the housing 104 is coupled to an example receiver tube 106, an example crossbar 108 and an example chain bracket 110. In the illustrated example of FIG. 1, the crossbar 108 is coupled to the example vehicle 100 via an example first hitch mounting plate 112A and an example second hitch mounting plate 112B. The load manager 102 is communicatively coupled to at least one of an example display 114 and an example camera 116.

In the illustrated example of FIG. 1, the vehicle 100 can tow a trailer coupled to the vehicle 100 via the example hitch 101. For example, a tow ball can be coupled to the hitch 101 via the example receiver tube 106. The coupled tow ball enables a trailer to be pivotally coupled to the hitch 101. In the illustrated example, the vehicle 100 is a consumer automobile. In other examples, the vehicle 100 can be a commercial truck, a motorcycle, a motorized cart, an all-terrain vehicle, a motorized scooter, a locomotive, or any other vehicle.

The load manager 102 receives load information (e.g., forces, torques, etc.) from the first load-sensing pin 105A and the second load-sensing pin 105B. In some examples, the load manager 102 can analyze the received load information to determine a load condition of the vehicle 100 and/or the hitch 101. For example, the load manager 102 can determine a vertical load condition (e.g., a load condition in a direction orthogonal to the ground), a horizontal load condition (e.g., a load condition in a direction parallel to the receiver tube 106, etc.) and/or a lateral load condition (e.g., a load condition in a direction parallel to the crossbar 108, etc.). In some examples, if the load condition satisfies an alert threshold, the load manager 102 can generate an alert to indicate to a user of the vehicle 100 that the vehicle 100 is improperly loaded.

In the illustrated example of FIG. 1, the example housing 104 is C-channel shaped to enable the housing 104 to be coupled to the example crossbar 108. In other examples, the housing 104 can have any other suitable shape. In the illustrated example, the housing 104 is coupled to the crossbar 108 via fasteners (e.g., bolts, screws, etc.). In other examples, any other suitable means of coupling the housing 104 to the crossbar 108 can be used (e.g., a weld, a press fit, etc.). In the illustrated example, the example housing 104 is coupled to the example receiver tube 106 via a weld, a press fit, one or more fasteners and/or any other suitable means.

The example load-sensing pins 105A, 105B are disposed within the example housing 104. In some examples, the load-sensing pins 105A, 105B are at substantially the same vertical position relative to the example crossbar 108. The example load-sensing pins 105A, 105B are described below in conjunction with FIG. 2A.

The example crossbar 108 is a structural element that connects the example housing 104 to the vehicle 100. In the illustrated example, the crossbar 108 has a quadrilateral cross-section. In other examples, the example crossbar 108 can have any other suitable cross-section (e.g., polygonal, circular, ovoid, etc.). In the illustrated example, the crossbar 108 is two tubes bisected by the housing 104. In other examples, the example crossbar 108 can be a single continuous tube. An example hitch that may be coupled to a single continuous crossbar is described below in conjunction with FIGS. 5 and 6.

The example chain bracket 110 acts as redundant attachment point between the hitch 101 and a trailer. For example, one or more chains or similar mechanical elements can be coupled to the hitch 101 and the chain bracket 110. In operation, if the primary coupling between the trailer and the hitch 101 fails (e.g., the coupling via the receiver tube 106, etc.), the chain(s) prevent the trailer from becoming detached from the hitch 101.

The example first hitch mounting plate 112A and the example second hitch mounting plate 112B can be used to couple the hitch 101 to the vehicle 100. For example, the hitch mounting plates 112A, 112B can be coupled to the frame of the vehicle 100 via one or more fasteners. In other examples, the hitch mounting plates 112A, 112B can be coupled to the vehicle 100 via any other suitable means (e.g., a weld, etc.).

The example load manager 102 can be communicatively coupled to the example display 114. In some examples, the display 114 can be within an interior of the vehicle 100 (e.g., a dashboard display, an overhead display, etc.). Additionally or alternatively, the display 114 can be included in a mobile device (e.g., a smartphone, a tablet, a smartwatch, etc.) of an operator or a passenger of the vehicle 100. In some examples, the display 114 can display the load condition determined by the load manager 102. In some examples, the display 114 can present an alert to a user of the vehicle 100 when a load condition satisfies an alert threshold.

In the illustrated example, the example load manager 102 is additionally coupled to the camera 116. In some examples, the camera 116 is mounted on an exterior surface of the vehicle 100 (e.g., the camera 116 is a backup assistance camera, etc.). In some examples, an output of the example camera 116 can be used to determine the orientation of a trailer coupled to the hitch 101.

Figure 2B:
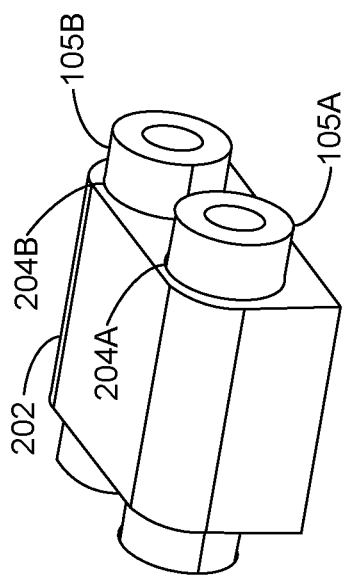
FIG. 2B illustrates the load-sensing pins of FIG. 2A disposed within a pin adapter.
Figure 2A:
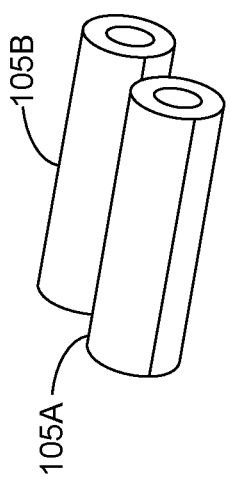
FIG. 2A illustrates the load-sensing pins of FIG. 1.

FIG. 2A illustrates the load-sensing pins 105A, 105B of FIG. 1. In the illustrated example of FIG. 2A, the example load-sensing pins 105A, 105B have a circular cross-section. In other examples, the load-sensing pins 105A, 105B can have any other suitable cross-sectional shape. In some examples, the first load-sensing pin 105A and/or the second load-sensing pin 105B can have a hollow cross-section. In other examples, the load-sensing pins 105A, 105B can have any other suitable cross-section (e.g., solid, etc.). In some examples, the diameter of the load-sensing pins 105A, 105B can be changed depending on the load rating of the hitch 101. For example, if the hitch 101 is designed to tow a relatively heavy load, the example load-sensing pins 105A, 105B can have an appropriate larger diameter. In some examples, to enable modularity of the hitch 101, the diameters and/or lengths of the load-sensing pins 105A, 105B can be incremented and selected based on tow capacity of the hitch 101 (e.g., a hitch with a larger tow capacity may use load-sensing pins with a large diameter, etc.). In the illustrated example, the first load-sensing pin 105A and the second load-sensing pin 105B have the same shape and diameter. In some examples, the first load-sensing pin 105A and the second load-sensing pin 105B are a ferrous material (e.g., high strength steel, etc.). In other examples, the load-sensing pin 105A and the second load-sensing pin 105B can be any other suitable material. In some examples, the first load-sensing pin 105A and the second load-sensing pin 105B can have different diameters, lengths, cross-sections and/or load ratings.

FIG. 2B illustrates the load-sensing pins 105A, 105B of FIG. 2A disposed within an example pin adapter 202. In the illustrated example, the example pin adapter 202 has an example first opening 204A and an example second opening 204B. In the illustrated example, the pin adapter 202 has a rectangular cross-section with top-filleted corners. In other examples, the pin adapter 202 can have any suitable cross-section (e.g., rectangular with chamfered corners, etc.). The example pin adapter 202 can be composed of metal or any combination of metals (e.g., steel, aluminum, etc.), composites (e.g., carbon fiber, etc.), plastics and/or any other suitable materials.

The example first load-sensing pin 105A and the example second load-sensing pin 105B are inserted into the pin adapter 202 via the example first opening 204A and the example second opening 204B, respectively. In the illustrated example, the openings 204A, 204B are shaped to allow the insertion of the load-sensing pins 105A, 105B. The example openings 204A, 204B can be shaped in a manner to prevent one or both of the load-sensing pins 105A, 105B from bearing load in a particular direction. For example, the first opening 204A may be shaped (e.g., ovoid, elliptical, etc.) to prevent the first load-sensing pin 105A from bearing a load in the horizontal direction (e.g., parallel to the receiver tube 106 of FIG. 1, etc.). In some examples, the first opening 204A can have small flat sections (e.g., 5 millimeters, etc.) on the top and bottom of the pin adapter 202. In such examples, the contact interface between the first load-sensing pin 105A and the pin adapter is a line contact. In some examples, the load-sensing pins 105A, 105B can be coupled to the pin adapter 202 via a press-fit within the openings 204A, 204B. In this example, this coupling can cause the load-sensing pins 105A, 105B to have a preload strain. In other examples, the load-sensing pins 105A, 105B may be coupled to the pin adapter 202 and/or openings 204A, 204B via any other suitable means (e.g., spline teeth, etc.).

Figure 2C:
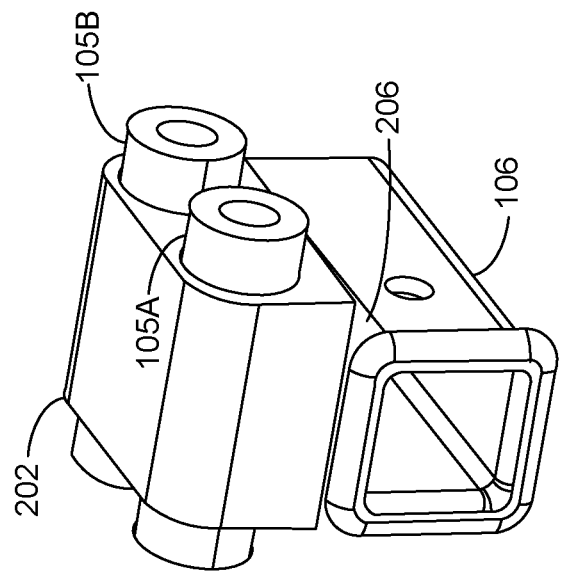
FIG. 2C illustrates the pin adapter of FIG. 2B coupled to the receiver tube of FIG. 1.

FIG. 2C illustrates the example pin adapter 202 of FIG. 2B coupled to the receiver tube 106 of FIG. 1. In the illustrated example, the pin adapter 202 is coupled to a top surface 206 of the receiver tube 106. In some examples, the pin adapter 202 provides a first load path between the receiver tube 106 and the first load-sensing pin 105A and a second load path between the receiver tube 106 the second load-sensing pin 105B. In the illustrated example, coupling the pin adapter 202 to the receiver tube 106 causes the first load-sensing pin 105A and the second load-sensing pin 105B to be at substantially the same vertical position relative to the receiver tube 106. In some examples, the pin adapter 202 is welded to the receiver tube 106. In other examples, the pin adapter 202 can be coupled to the receiver tube 106 via any other suitable means or combination of means (e.g., a press fit, a fastener, etc.). In some examples, the receiver tube 106 can be integral with the pin adapter 202.

Figure 3:
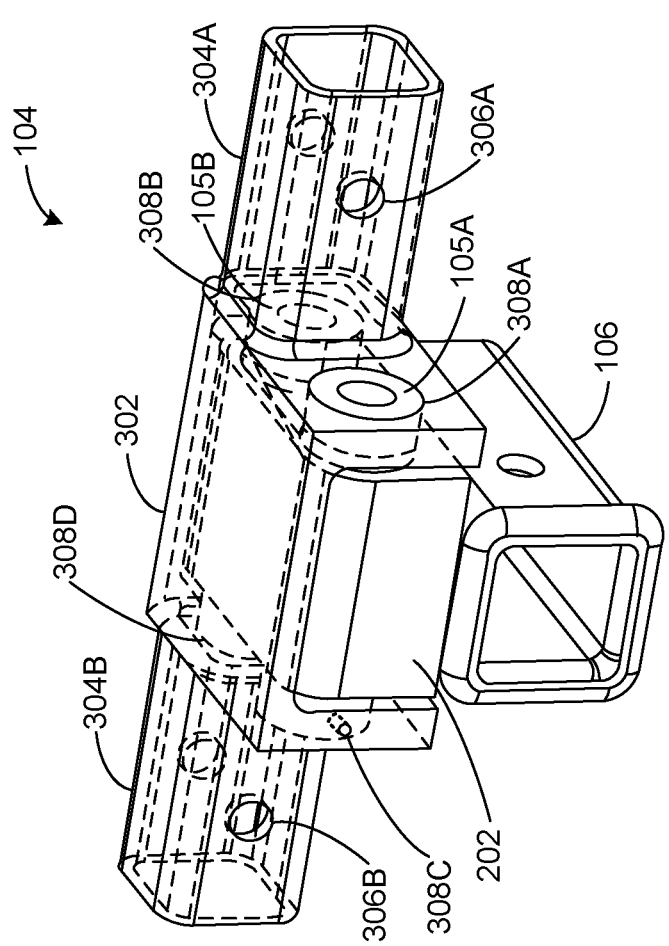
FIG. 3 illustrates an isometric view of the load-sensing pin housing of FIG. 1.

FIG. 3 illustrates an isometric view of the load-sensing pin housing 104 of FIG. 1. The housing 104 includes an example pin adapter housing 302, the first load-sensing pin 105A, the second load-sensing pin 105B, the pin adapter 202, an example first crossbar interface 304A and an example second crossbar interface 304B. In the illustrated example, the first crossbar interface 304A includes an example first fastener aperture 306A and the example second crossbar interface 304B includes an example second fastener aperture 306B. In the illustrated example, the pin adapter housing 302 includes an example first aperture 308A, an example second aperture 308B, an example third aperture 308C, and an example fourth aperture 308D.

In the illustrated example, the example pin adapter housing 302 is C-channel shaped. Alternatively, the pin adapter housing 302 can be any other suitable shape to allow the pin adapter housing 302 to be coupled to the pin adapter 302. The first aperture 308A is aligned with the third aperture 308C. Similarly, the second aperture 308B is aligned with the fourth aperture 308D. In the illustrated example, the pin adapter housing 302 is coupled to the pin adapter 202 via the load-sensing pins 105A, 105B. For example, the first load-sensing pin 105A can be inserted into the first aperture 308A, through the pin adapter 202 (e.g., via the opening 204A of FIG. 2B) and further through the third aperture 308C. Similarly, the second load-sensing pin 105B can be inserted through the second aperture 308B, through the pin adapter 202 (e.g., via the opening 204B of FIG. 2B) and further through the third aperture 308C. Additionally or alternatively, the pin adapter housing 302 can be coupled to pin adapter 302 via any other means (e.g., press fit, etc.).

The example first crossbar interface 304A and the example second crossbar interface 304B enables the housing 104 to be coupled to a crossbar (e.g., the example crossbar 108 of FIG. 1, etc.). In some examples, the shape of the crossbar interfaces 304A, 304B corresponds to the shape of the crossbar 108 (e.g., the crossbar interfaces 304A, 304B have circular cross-sections, etc.). In the illustrated example, the cross-section of the first crossbar interface 304A corresponds to the cross-section of the crossbar 108, which enables the example first crossbar interface 304A to be inserted into the crossbar 108. Similarly, the cross-section of the example second crossbar interface 304B corresponds to the example crossbar 108. In some examples, the housing 104 can be further coupled to the crossbar 108 via one or more bolts coupled to the housing 104 and crossbar 108 via the example fastener apertures 306A, 306B.

Figure 4:
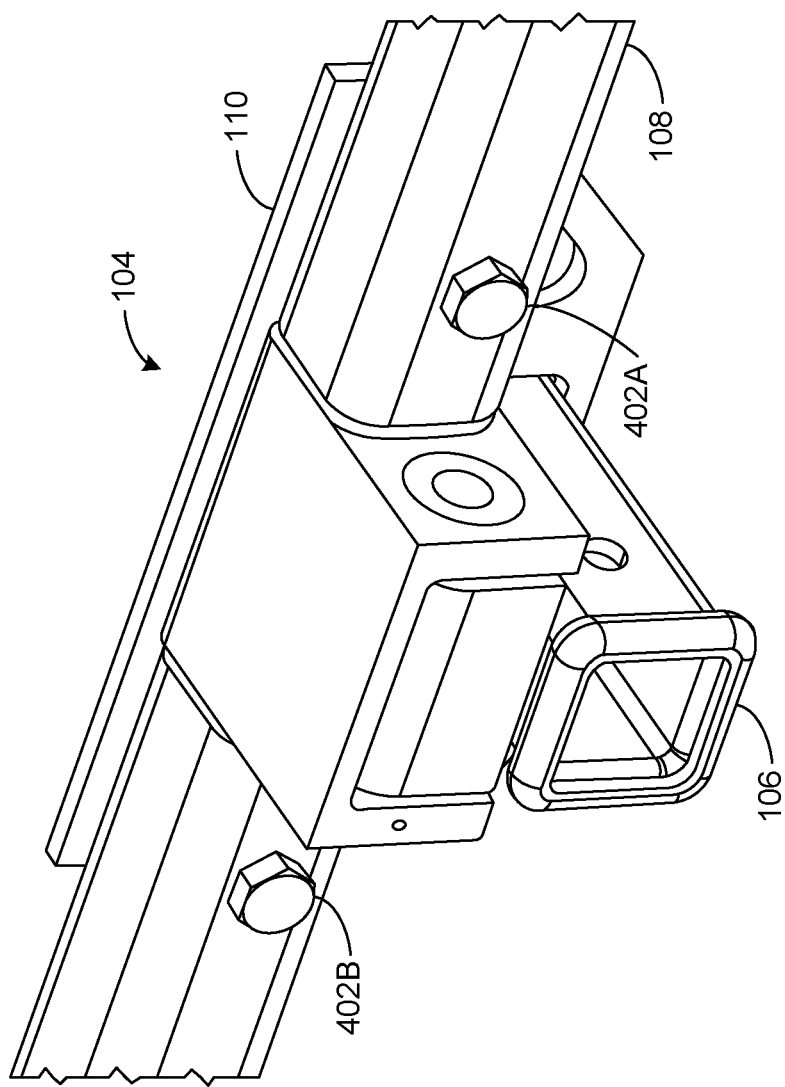
FIG. 4 illustrates an isometric view of the load-sensing pin housing of FIG. 3 coupled to the crossbar of FIG. 1.
Figure 5:
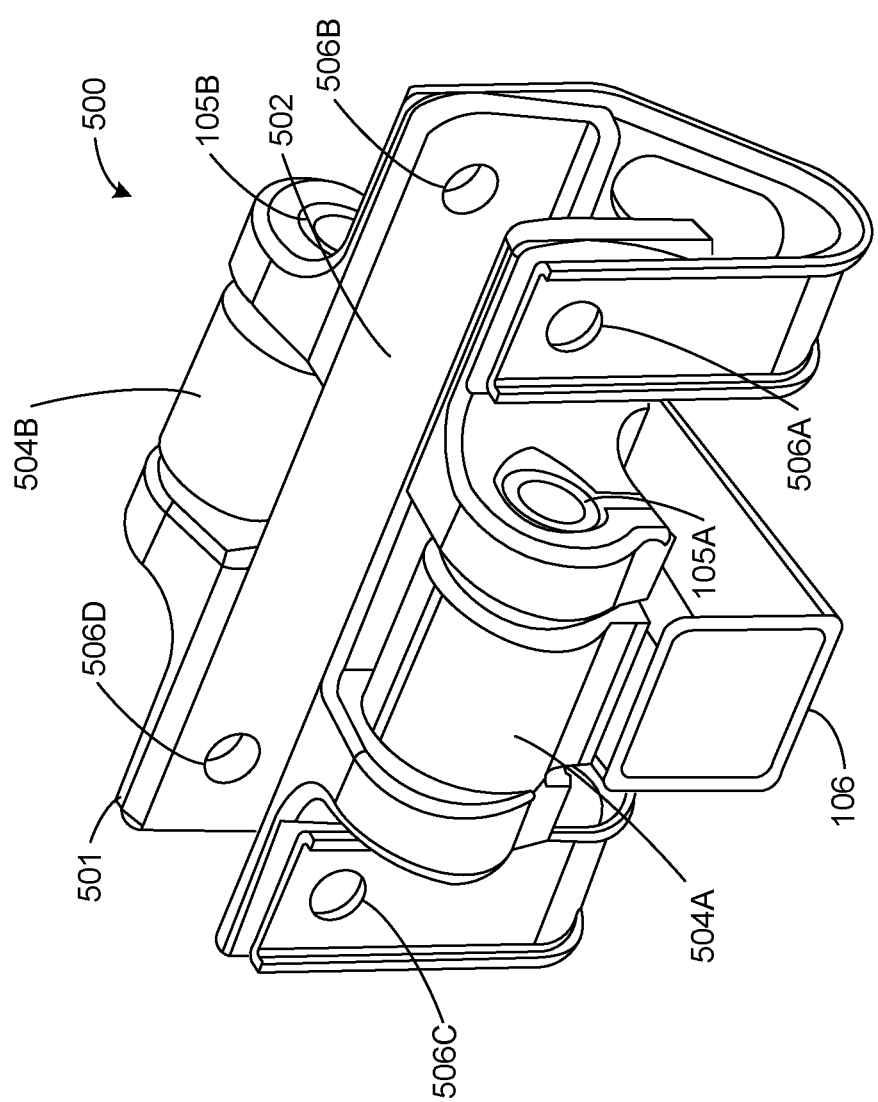
FIG. 5 illustrates an isometric view of an alternative example of a load-sensing pin housing by which the examples disclosed herein may be implemented.

FIG. 4 illustrates an isometric view of the load-sensing pin housing 104 of FIG. 3 coupled to the crossbar 108 of FIG. 1. The load-sensing pin housing 104 is further coupled to the chain bracket 110 of FIG. 4. The load-sensing pin housing 104 is coupled to the crossbar 108 and the chain bracket 110 via an example first fastener 402A and an example second fastener 402B. In the illustrated example, the fasteners 402A, 402B are bolts. In other examples, the fasteners 402A, 402B can be any other suitable type of fastener (e.g., screws, rivets, etc.). In some examples, the chain bracket can be welded directly to the example housing 104. In some examples, the load-sensing pins 105A, 105B act as the only load path between the receiver tube 106 and the crossbar 108. For example, the first load-sensing pin 105A acts a first load path between the receiver tube FIG. 5 illustrates an isometric view of an alternative example load-sensing pin-housing assembly 500 by which the examples disclosed herein may be implemented. In the illustrated example, the pin-housing assembly 500 includes an example pin housing 501. The pin housing 501 includes an example channel 502 to enable the coupling of a continuous crossbar (e.g., as opposed to the segmented crossbar 108 of FIG. 1) to be coupled the pin-housing assembly 500. The pin-housing assembly 500 further includes an example first pin adapter 504A and an example second pin adapter 504B. In the illustrated example, a continuous crossbar may be coupled to the pin-housing via a first bolt via an example first aperture 506A and an example second aperture 506B and a second bolt via an example third aperture 506C and an example fourth aperture 506D.

In the illustrated example of FIG. 5, the first pin adapter 504A is disposed on a rear-side (e.g., a trailer side, etc.) of the channel 502 and the second pin adapter 504B is disposed on a front side (e.g., a vehicle side, etc.) of the channel 502. In the illustrated example, the first loading-sensing pin 105A is coupled to the first pin adapter 504A and the second load-sensing pin 105B is coupled to the second pin adapter 504B. In the illustrated example, the first pin adapter 504A and the second pin adapter 504B are each coupled to the receiver tube 106 via a weld, fastener and/or any other suitable means. In some examples, the first pin adapter 504A and the second pin adapter 504B are provided in a unitary part. In the illustrated example, the load-sensing pins 105A, 105B are at substantially the same vertical position relative to the receiver tube 106.

Figure 6:
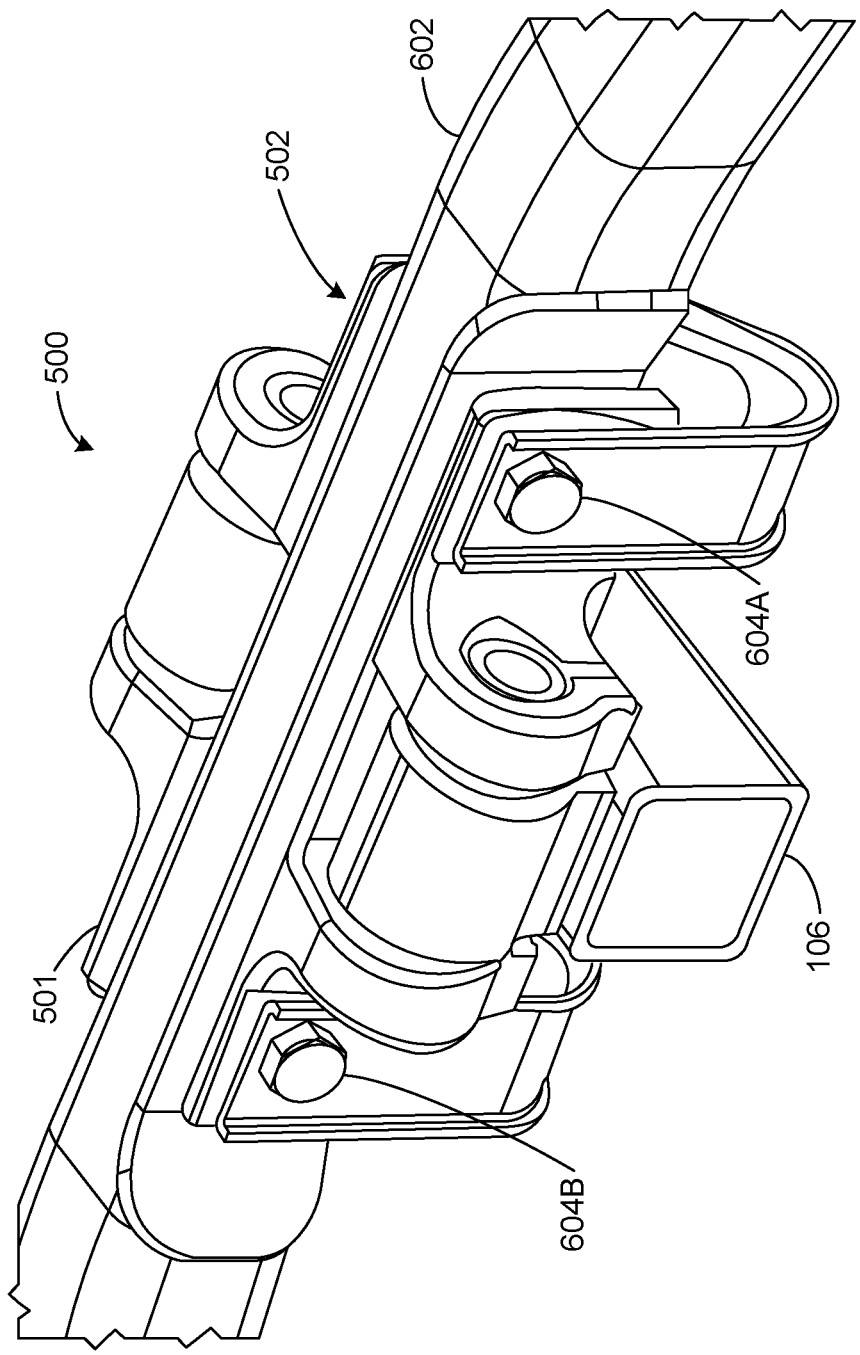
FIG. 6 illustrates an isometric view of the load-sensing pin housing of FIG. 5 coupled to a crossbar.

FIG. 6 illustrates an isometric view of the load-sensing pin housing 501 of FIG. 5 coupled to an example crossbar 602. In the illustrated example, the crossbar 602 is disposed within the channel 502 and coupled to pin housing 501 via an example first fastener 604A and an example second fastener 604B. In the illustrated examples, the fasteners 604A, 604B are bolts. In other examples, the fasteners 604A, 604B can be any other suitable type of fastener (e.g., screws, rivets, etc.). In some examples, the load-sensing pins 105A, 105B act as the only load path between the receiver tube 106 and the crossbar 602.

Figure 7A:
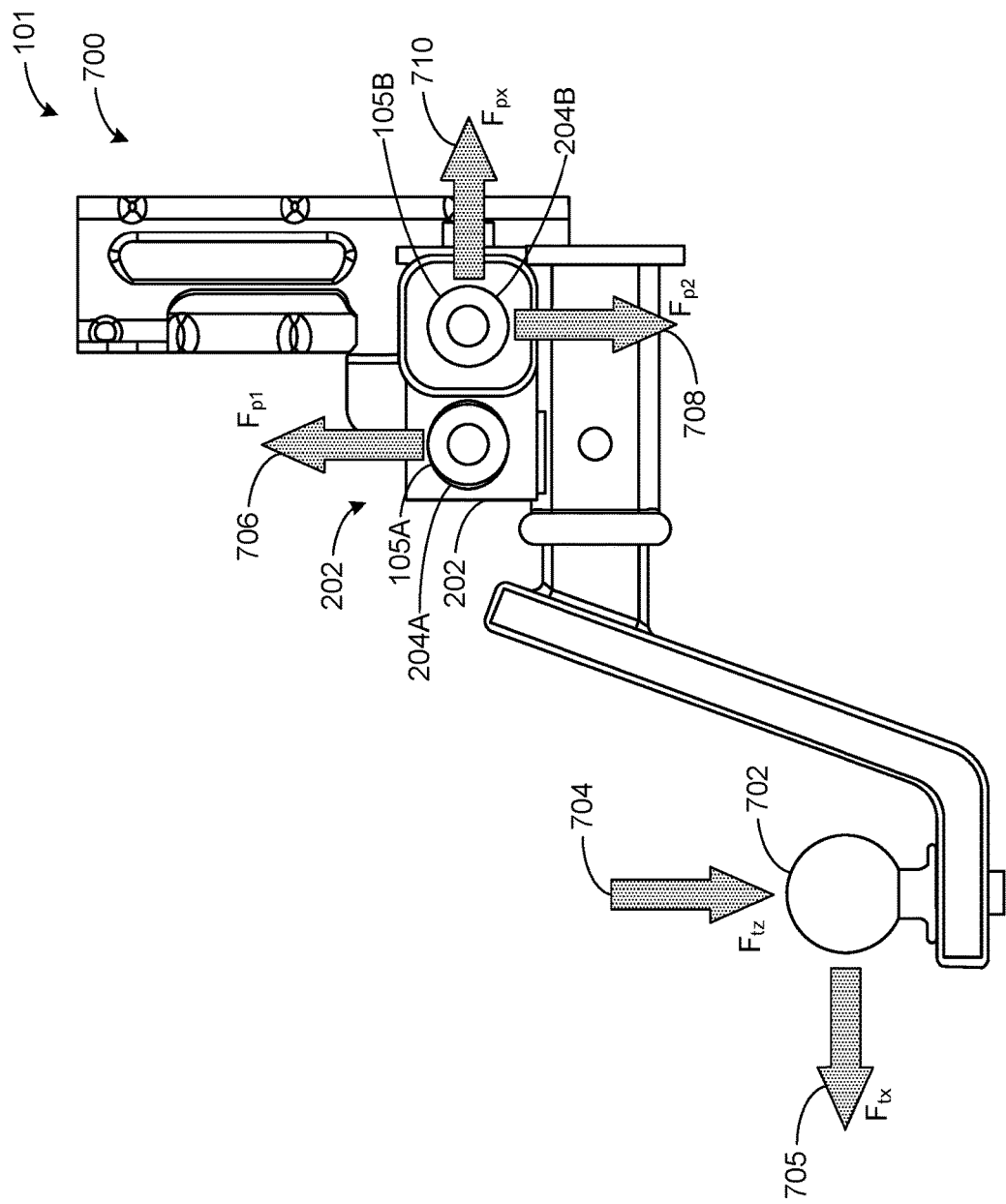
FIGS. 7A-7B illustrate an example loading condition on a hitch ball associated with a trailer and the corresponding load-sensing pins of FIGS. 2A-2C.

FIG. 7A illustrates a side view of an example loading condition 700 on the example hitch 101 of FIG. 1 associated with a trailer and the corresponding reaction force sensing pins of FIGS. 2A-2C. In the illustrated example of FIG. 7A, the load condition 700 is based on a load applied to an example hitch ball 702, where the load is transmitted to a crossbar via the load-sensing pins 105A, 105B. In the illustrated example, the load condition 700 is based on an example applied vertical load 704, an example applied horizontal load 705, an example first vertical reactionary load 706, an example second vertical reactionary load 708, and an example first horizontal reactionary load 710.

In the illustrated example, the second load-sensing pin 105B carries the example second vertical reactionary load 708 and the example first horizontal reactionary load 710. In the illustrated example, the first load-sensing pin 105A carries the example first vertical reactionary load 706. In some examples, the first load-sensing pin 105A does not carry a horizontal reactionary load because the example first opening 204A of FIG. 2 is shaped to prevent the first load-sensing pin 105A from carrying a horizontal load. In the illustrated example, the example first opening 204A is ovoid (e.g., elongated in the horizontal direction, etc.) which prevents a horizontal contact between first load-sensing pin 105A and the pin adapter 202. In some examples, the first opening 204A is shaped in a manner to prevent horizontal contact in any loading scenario (e.g., the deflection caused by the coupled trailer, etc.).

In some examples, the first vertical reactionary load 706, the second vertical reactionary load 708, and the first horizontal reactionary load 710 are measured by the example load-sensing pins 105A, 105B. In some examples, the load manager 102 can determine the applied vertical load 704 and the applied horizontal load 705 based on the first vertical reactionary load 706, the second vertical reactionary load 708, and the first horizontal reactionary load 710. In some examples, the load manager 102 can use static equilibrium analysis (e.g., torque balancing, force balancing, etc.) to determine a magnitude of the applied loads 704, 705. For example, the applied vertical load 704 can be calculated using equation (1):

$$\Sigma F_z = -F_{tz} + F_{p1} - F_{p2} = 0 \quad (1)$$

where $\Sigma F_z$ is the sum of the forces in the vertical direction, $F_{tz}$ is the applied vertical load 704, $F_{z1}$ is the first vertical reactionary load 706, and $F_{p2}$ is the second vertical reactionary load 708. In this example, the applied vertical load 704 is equal to the difference between the first vertical reactionary load 706 and the second vertical reactionary load 708. Similarly, the first applied horizontal load 705 can be determined using equation (2):

$$\Sigma F_x = -F_{tx} + F_{px} = 0 \quad (2)$$

where $\Sigma F_x$ is the sum of the forces in the horizontal direction, $F_{tx}$ is the first applied horizontal load 705 and $F_{px}$ is the first horizontal reactionary load 710. In this example, the first applied horizontal load 705 is equal and opposite to the first horizontal reactionary load 710.

Figure 7B:
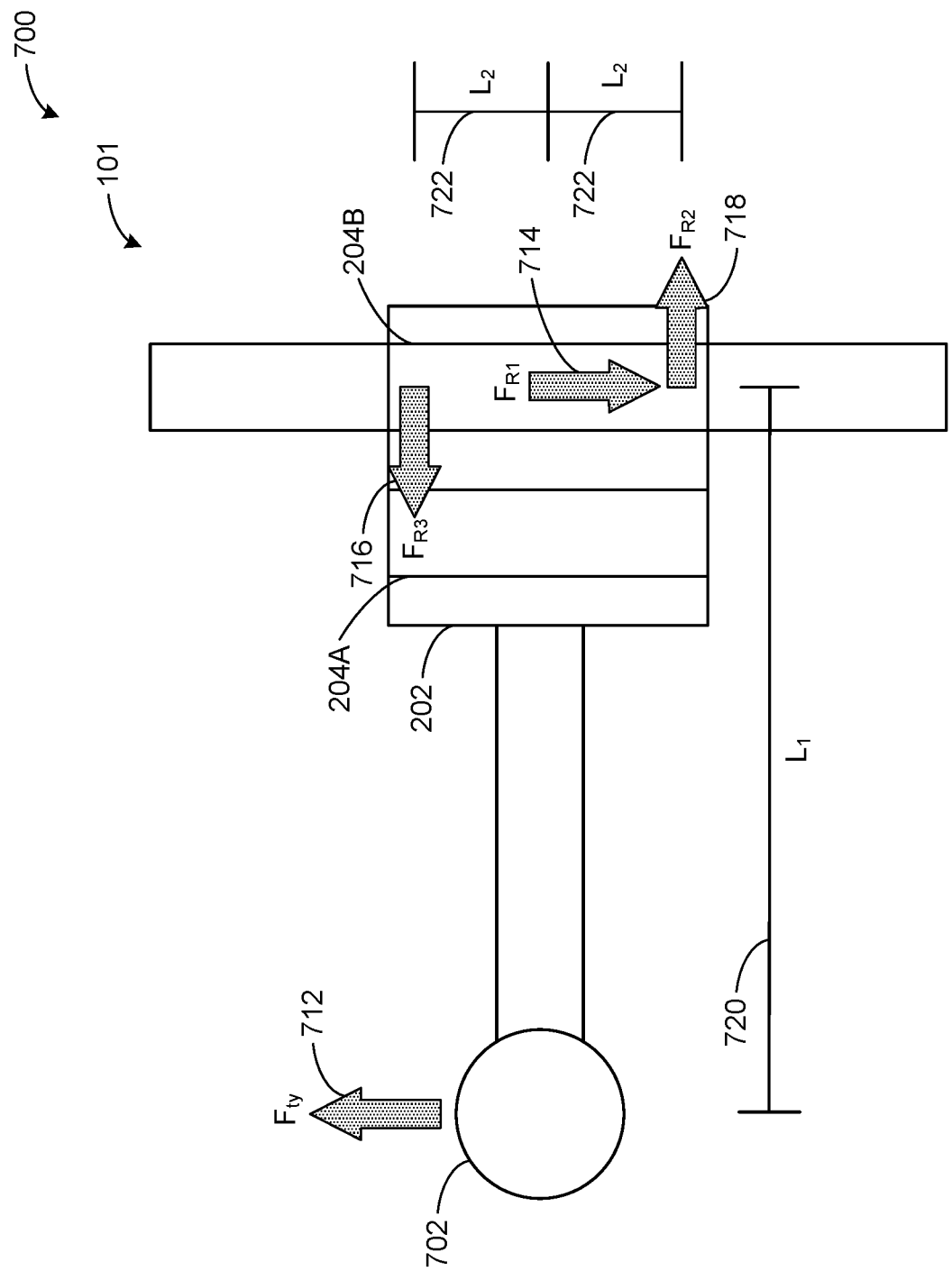

FIG. 7B illustrates an example top view of the example loading condition 700 on the example hitch 101 of FIG. 1 associated with a trailer and the corresponding reaction force sensing pins of FIGS. 2A-2C. In the illustrated example of FIG. 7B, the load condition 700 is further based on a lateral applied load 712 applied to the example hitch ball 702 and an example lateral reactionary load 714. In the illustrated example, the moment generated by the lateral applied load 712 further causes an example second horizontal reactionary load 716 and an example third horizontal reactionary load 718. In the illustrated example, an example first length 720 is the horizontal distance between the applied lateral load 712 and the lateral reactionary load 714. In the illustrated example, an example second length 722 is the lateral distance between the applied lateral load 712 and the example second horizontal reactionary load 716, and the lateral distance between the applied lateral load 712 and the second horizontal reactionary load 716.

In the illustrated example, the second load-sensing pin 105B carries the example second horizontal reactionary load 716 and the example third horizontal reactionary load 718. In the illustrated example, the first load-sensing pin 105A does not carry a horizontal reactionary load because the example first opening 204A of FIG. 2 is shaped to prevent the first load-sensing pin 105A from bearing a horizontal load. In some examples, the lateral reactionary load 714 is measured by the example load-sensing pin 105B. In some examples, the load manager 102 can determine the applied lateral load 712 based on the lateral reactionary load 714. For example, the applied lateral load 712 can be calculated using equation (3):

$$\Sigma F_y = F_{ty} = -F_{R1} = 0 \quad (3)$$

where $\Sigma F_y$ is the sum of the forces in the lateral direction, $F_{ty}$ is the applied lateral load 712 and $F_{R1}$ is the lateral reactionary load 714. In this example, the applied lateral load 712 is equal and opposite to the lateral reactionary load 714.

In some examples, the lateral reactionary load 714 is not measured by the load-sensing pin 105B (e.g., the reactionary load is carried by a retainer clip, the load-sensing pin 105B cannot measure lateral forces, etc.). In such examples, the applied lateral load 712 cannot be calculated using equation (3). Accordingly, the applied lateral load 712 can be calculated using moment balancing about the center of the second load-sensing pin 105B:

$$0 = L_2 F_{R2} + L_2 F_{R3} - L_1 F_{ty} \quad (4)$$

where $F_{ty}$ is the applied lateral load 712, $F_{R2}$ is the second horizontal reactionary load 716, $F_{R3}$ is the third horizontal reactionary load 718, $L_1$ is the first length 720 and $L_2$ is the second length 722. Equation (4) can be solved for $F_{ty}$:

$$F_{ty} = \frac{2 L_2 F_{R2}}{L_1} \quad (5)$$

In some examples, the shape of the example opening 204A makes the load condition of the hitch 101 statically determinate, which allows the load condition to be determined without determining the geometry of the tow ball 702. Additionally or alternatively, the load manager 102 can incorporate rear view camera data to assist in determining the applied loads 704, 705, 712. For example, the load manager 102 can determine the moment arm (e.g., the position of the tow ball, etc.) associated with the applied loads 704, 705, 712. In some examples, an operator of the vehicle 100 can manually input the geometry of the tow ball 702 into the load manager 102.

Figure 8:
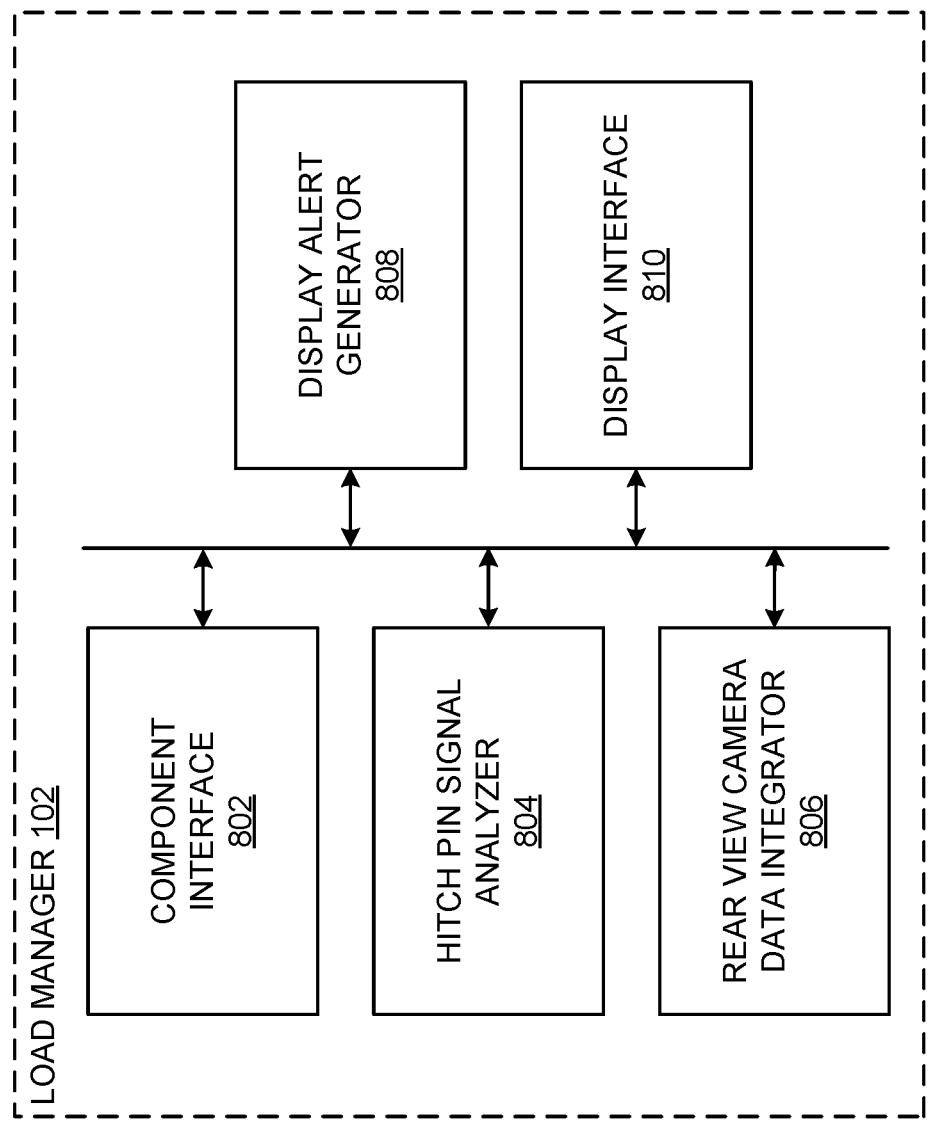
FIG. 8 is a block diagram detailing the hitch pin load manager of FIG. 1.

FIG. 8 is a block diagram detailing the example load manager 102 of FIG. 1. The example load manager 102 includes an example component interface 802, an example hitch pin signal analyzer 804, an example rear view camera data integrator 806, an example display alert generator 808 and an example display interface 810.

The example component interface 802 receives data from the load-sensing pins 105A, 105B, camera 116 and/or any other components of the vehicle 100 and/or hitch 101. In some examples, the component interface 802 facilitates communication of the hitch pin signal analyzer 804, the rear view camera data integrator 806, the display alert generator 808 and the display interface 810. In some example, the component interface 802 can convert the received data from the components into a numerical form (e.g., human readable, etc.). For example, if the load-sensing pins 105A, 105B output an analog signal (e.g., an analog voltage, an analog current, etc.) the component interface 802 can convert the received data into values corresponding to the first vertical reactionary load 706, the second vertical reactionary load 708, the first horizontal reactionary load 710, and/or the lateral reactionary load 714.

The example hitch pin signal analyzer 804 analyzes the received load signals from the component interface 802 to determine the vertical load condition of the vehicle 100 (e.g., corresponding to the applied vertical load 704 of FIG. 7A, etc.), the horizontal load condition of the vehicle 100 (e.g., corresponding to the applied horizontal load 705 of FIG. 7A, etc.) and/or the lateral load condition of the vehicle 100 (e.g., corresponding to the applied lateral load 712, etc.). For example, the hitch pin signal analyzer 804 can use static equilibrium analysis (e.g., force balancing, moment balancing, etc.) to determine the applied vertical load 704, the applied horizontal load 705 and/or the applied lateral load 712. For example, the hitch pin signal analyzer 804 can use equations (1), (2), (3) and/or (5) to determine the applied loads 704, 705, 712. In some examples, the hitch pin signal analyzer 804 can determine if at least one of the vertical load condition, the horizontal load condition or the lateral load condition satisfies an alert threshold. In some examples, the alert threshold corresponds to an improper (e.g., misload, unbalanced, etc.) load condition.

The example rear view camera data integrator 806 retrieves image data from the camera 116 of FIG. 1. In some examples, the image data is processed by the camera data integrator 806 to determine a position of a trailer coupled to the vehicle 100. In some examples, the camera data integrator 806 can use this data to determine a moment or torque applied to the hitch 101. For example, the camera data integrator 806 can determine a displacement of a lateral displacement of the trailer that can be used to determine a moment applied to the hitch 101.

The example display alert generator 808 generates a notification to be presented to a user of the vehicle 100. For example, the display alert generator 808 can generate an alert if the hitch pin signal analyzer 804 determines that an alert threshold is satisfied. In some examples, the display alert generator 808 can generate a visual alert to be presented to the user via the display 114. Additionally or alternatively, the display alert generator 808 can generate an auditory alert to be presented to the user (e.g., the alert may be presented over speakers of the vehicle 100, a mobile device of the user, etc.). In some examples, the display alert generator 808 can generate instructions indicating to the user how to correct the load condition.

The example display interface 810 communicates with the display 114 to present the horizontal load condition, the vertical load condition and/or an alert generated by the display alert generator 808. In some examples, the display interface 810 can cause the display 114 to present graphics, sounds and/or warnings to a user of the vehicle 100 illustrating the horizontal load condition, the vertical load condition and/or an alert.

While an example manner of implementing the load manager 102 of FIG. 1 is illustrated in FIG. 8, one or more of the elements, processes and/or devices illustrated in FIG. 4 may be combined, divided, re-arranged, omitted, eliminated and/or implemented in any other way. Further, the example component interface 802, the example hitch pin signal analyzer 804, the example rear view camera data integrator 806, the example display alert generator 808, the example display alert generator display interface 810 and/or, more generally, the example load manager 102 of FIG. 8 may be implemented by hardware, software, firmware and/or any combination of hardware, software and/or firmware. Thus, for example, any of the example component interface 802, the example hitch pin signal analyzer 804, the example rear view camera data integrator 806, the example display alert generator 808, the example display alert generator display interface 810 and/or, more generally, the example load manager 102 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example component interface 802, the example hitch pin signal analyzer 804, the example rear view camera data integrator 806, the example display alert generator 808, the example display alert generator display interface 810 is/are hereby expressly defined to include a non-transitory computer readable storage device or storage disk such as a memory, a digital versatile disk (DVD), a compact disk (CD), a Blu-ray disk, etc. including the software and/or firmware. Further still, the example load manager 102 of FIG. 1 may include one or more elements, processes and/or devices in addition to, or instead of, those illustrated in FIG. 8, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 9:
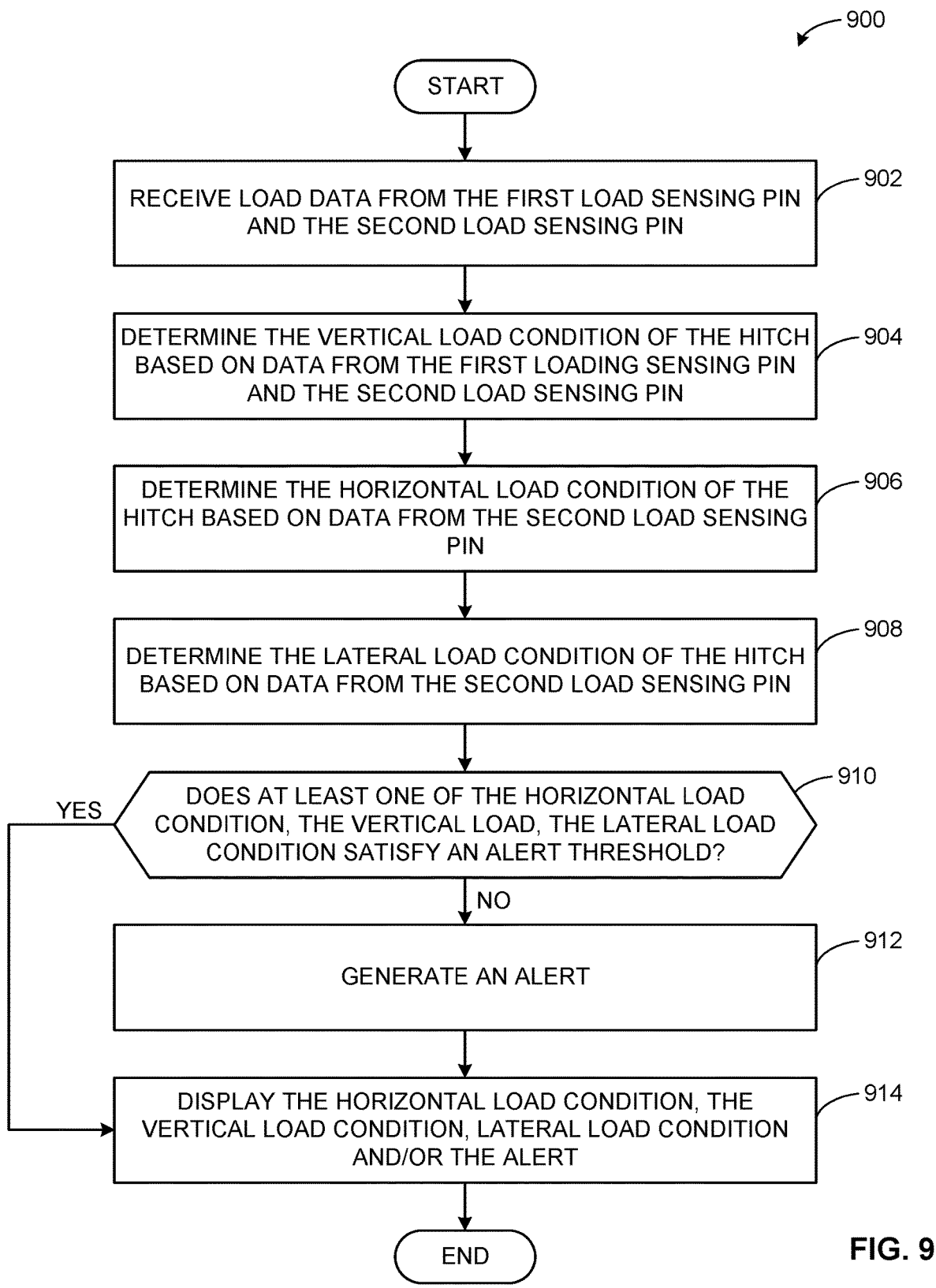
FIG. 9 is a flowchart representative of machine readable instructions that may be executed to implement the hitch pin load manager of FIG. 1.

A flowchart representative of example methods, hardware implemented state machines, and/or any combination thereof for implementing the load manager 102 of FIG. 8 is shown in FIG. 9. The method may be an executable program or portion of an executable program for execution by a computer processor such as the processor 1012 shown in the example processor platform 1000 discussed below in connection with FIG. 10. The program may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowchart illustrated in FIG. 9, many other methods of implementing the example load manager 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example method 900 of FIG. 9 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

The method 900 of FIG. 9 begins at block 902. At block 902, the example component interface 802 receives load data from the first load-sensing pin 105A and the second load-sensing pin 105B. For example, the component interface 802 can receive data from the first load-sensing pin 105A and/or the second load-sensing pin 105B in an analog format (e.g., a voltage, etc.). In this example, the component interface 802 converts the analog format into a digital value (e.g., a force, a pressure, etc.).

At block 904, the hitch pin signal analyzer 804 determines the vertical load condition of the hitch 101 based on data from the first loading-sensing pin 105A and the second load-sensing pin 105B. For example, the hitch pin signal analyzer 804 can use the example first vertical reactionary load 706 and the example second vertical reactionary load 708 to determine the example applied vertical load 704 using static equilibrium analysis techniques. For example, the hitch pin signal analyzer 804 can utilize equation (1) to determine the applied vertical load 704. In other examples, the hitch pin signal analyzer 804 can use any other suitable means to determine the vertical load condition.

At block 906, the example hitch pin signal analyzer 804 determines the horizontal load condition of the hitch 101 based on data from the second load-sensing pin 105B. In some examples, the hitch pin signal analyzer 804 can use the first horizontal reactionary load 710 to determine the applied horizontal load 705 using static equilibrium analysis techniques. For example, the hitch pin signal analyzer 804 can utilize equation (2) to determine the applied vertical load 704. In other examples, the hitch pin signal analyzer 804 can use any other suitable means to determine the horizontal load condition.

At block 908, the example hitch pin signal analyzer 804 determines the lateral load condition of the hitch 101 based on data from the second load-sensing pin 105B. For example, the hitch pin signal analyzer 804 can use the moment measured at the second load-sensing pin 105B to determine the lateral load condition. In some examples, the shape of the opening 204A prevents the first load-sensing pin 105A from bearing a reactionary moment, which enables the calculation of the lateral loading condition. For example, the hitch pin signal analyzer 804 can utilize equations (3) and/or (5) to determine the applied vertical load 704.

At block 910, the example display alert generator 808 determines if at least one of the horizontal load condition, the vertical load, and the lateral load condition satisfies an alert threshold. If at least one of the horizontal load condition, the vertical load, and the lateral load condition satisfies the alert threshold, the method 900 advances to block 912. If at least one of the horizontal load condition, the vertical load, the lateral load condition does not satisfy the alert threshold, the method 900 advances to block 914.

At block 912, the display alert generator 808 generates an alert. For example, the display alert generator 808 can generate an audio alert, a visual alert, etc. In some examples, the display alert generator 808 can generate an alert including a description of the load condition triggering the alert. In some examples, the display alert generator 808 can generate an instruction indicating how to correct the load condition.

At block 914, the display interface 810 displays the horizontal load condition, the vertical load condition, lateral load condition and/or the alert. For example, the display interface 810 can cause the example display 114 to present the generated alert to a user of the vehicle 100.

Figure 10:
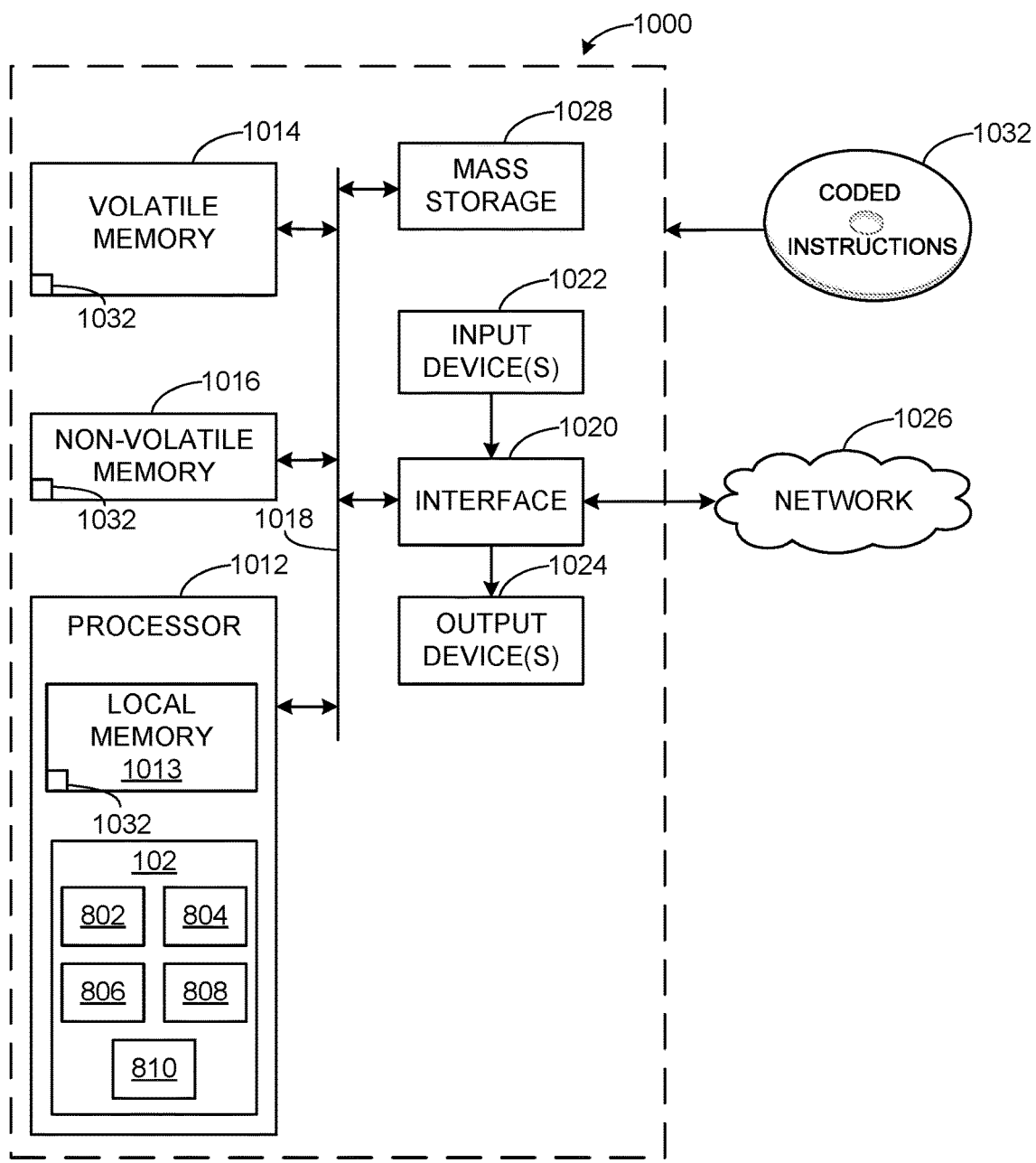
FIG. 10 is a block diagram of an example processing platform structured to execute the instructions of FIG. 9 to implement the load manager of FIG. 8.

FIG. 10 is a block diagram of an example processor platform 1000 structured to execute the method 900 of FIG. 9 to implement the load manager 102 of FIG. 8. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a headset or other wearable device, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements an example component interface 802, an example hitch pin signal analyzer 804, an example rear view camera data integrator 806, an example display alert generator 808 and an example display interface 810.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

The machine executable instructions 1032 of FIG. 9 may be stored in the mass storage device 1028, in the volatile memory 1014, in the non-volatile memory 1016, and/or on a removable non-transitory computer readable storage medium such as a CD or DVD.

Example 1 includes an apparatus to be coupled to a receiver tube, apparatus comprising a crossbar interface to be coupled to a crossbar of a hitch, a pin adapter coupled to the crossbar interface, a first load-sensing pin disposed within the pin adapter, and a second load-sensing pin disposed within the pin adapter.

Example 2 includes the apparatus as defined in example 1, wherein the pin adapter is to provide a first load path between the receiver tube and the first load-sensing pin and a second load path between the receiver tube and the second load-sensing pin.

Example 3 includes the apparatus as defined in example 1, wherein the pin adapter is shaped such that the pin adapter does not contact a horizontal surface of the first load-sensing pin.

Example 4 includes the apparatus as defined in example 1, wherein the first load-sensing pin and the second load-sensing are at substantially the same vertical position relative to the crossbar.

Example 5 includes the apparatus as defined in example 1, further including a load manager including a component interface to receive load data from at least one of the first load-sensing pin and the second load-sensing pin, a hitch pin signal analyzer to determine a load condition of the housing based on the load data, and a display interface to display the load condition.

Example 6 includes the apparatus as defined in example 5, wherein a configuration of the first load-sensing pin and the second load-sensing pin causes the load condition to be statically determinate.

Example 7 includes the apparatus as defined in example 1, wherein the first load-sensing pin and the second load-sensing pin provide the only load path between the receiver tube and the crossbar.

Example 8 includes an apparatus, comprising a component interface to receive load data from a first load-sensing pin and a second load-sensing pin, the first load-sensing pin and the second load-sensing pin operatively coupled to a receiver tube of a hitch of a vehicle, a hitch pin signal analyzer to determine a load condition of the hitch based on the load data, a display alert generator to, when the load condition satisfies an alert threshold, generate an alert, and a display interface to display at least one of the load condition or the alert.

Example 9 includes the apparatus as defined in example 8, further including a pin adapter to provide a load path between the first and second load-sensing pins and the vehicle.

Example 10 includes the apparatus as defined in example 9, wherein the pin adapter is shaped such that the pin adapter does not contact a horizontal surface of the first load-sensing pin.

Example 11 includes the apparatus as defined in example 8, wherein the hitch pin signal analyzer is further to determine a vertical load condition of the hitch based on data from the first load-sensing pin and the second load-sensing pin and determine a horizontal load condition of the hitch based on data from the second load-sensing pin.

Example 12 includes the apparatus as defined in example 9, wherein the hitch pin signal analyzer determines the load condition based on a configuration of the first load-sensing pin and the second load-sensing pin, the configuration causing the load condition to be statically determinate.

Example 13 includes the apparatus as defined in example 12, wherein the configuration includes the first load-sensing pin and the second load-sensing pin at substantially the same vertical position relative to the receiver tube.

Example 14 includes the apparatus as defined in example 8, wherein the alert threshold corresponds to an improper load condition.

Example 15 includes a method, comprising receiving load data from a first load-sensing pin and a second load-sensing pin, the first load-sensing pin and the second load-sensing pin are operatively coupled to a receiver tube of a hitch of a vehicle, determining a load condition of the hitch based on the load data, when the load condition satisfies an alert threshold, generating an alert, and presenting at least one of the load condition or the alert to a user.

Example 16 includes the method as defined in example 15, wherein the first load-sensing pin and the second load-sensing pin is coupled to a pin adapter that is the only load path between the first and second load-sensing pins and the receiver tube.

Example 17 includes the method as defined in example 16, wherein the pin adapter is shaped such that the pin adapter does not contact a horizontal surface of the first load-sensing pin.

Example 18 includes the method as defined in example 15, further including determining a vertical load condition of the hitch based on data from the first load-sensing pin and the second load-sensing pin and determining a horizontal load condition of the hitch based on data from the second load-sensing pin.

Example 19 includes the method as defined in example 15, wherein the determination of the load condition is based on a configuration of the first load-sensing pin and the second load-sensing pin, the configuration causing the load condition to be statically determinate.

Example 20 includes the method as defined in example 19, wherein the configuration includes the first load-sensing pin and the second load-sensing pin at substantially the same vertical position relative to the receiver tube.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to be coupled to a receiver tube, apparatus comprising:
    a crossbar interface to be coupled to a crossbar of a hitch;
    a pin adapter coupled to the crossbar interface;
    a first load-sensing pin disposed within the pin adapter, the pin adapter shaped such that the pin adapter does not contact a horizontal surface of the first load-sensing pin; and
    a second load-sensing pin disposed within the pin adapter.

2. The apparatus as defined in claim 1, wherein the pin adapter is to provide a first load path between the receiver tube and the first load-sensing pin and a second load path between the receiver tube and the second load-sensing pin.

3. The apparatus as defined in claim 1, wherein the first load-sensing pin and the second load-sensing pin are at substantially the same vertical position relative to the crossbar.

4. The apparatus as defined in claim 1, further including a load manager including:
    a component interface to receive load data from at least one of the first load-sensing pin and the second load-sensing pin;
    a hitch pin signal analyzer to determine a load condition of the pin adapter based on the load data; and
    a display interface to display the load condition.

5. The apparatus as defined in claim 4, wherein a configuration of the first load-sensing pin and the second load-sensing pin causes the load condition to be statically determinate.

6. The apparatus as defined in claim 1, wherein the first load-sensing pin and the second load-sensing pin provide the only load path between the receiver tube and the crossbar.

7. The apparatus of claim 1, wherein the first load-sensing pin is to be disposed on an opposite side of the crossbar as the second load-sensing pin.

8. An apparatus, comprising:
    a component interface to receive load data from a first load-sensing pin and a second load-sensing pin, the first load-sensing pin and the second load-sensing pin operatively coupled to a receiver tube of a hitch of a vehicle, the first load-sensing pin and the second load-sensing pin disposed within a pin adapter, the pin adapter shaped such that the pin adapter does not contact a horizontal surface of the first load-sensing pin;
    a hitch pin signal analyzer to determine a load condition of the hitch based on the load data;
    a display alert generator to, when the load condition satisfies an alert threshold, generate an alert; and
    a display interface to display at least one of the load condition or the alert to a user.

9. The apparatus as defined in claim 8, wherein the pin adapter provides a load path between the first and second load-sensing pins and the vehicle.

10. The apparatus as defined in claim 8, wherein the hitch pin signal analyzer is to:
    determine a vertical load condition of the hitch based on data from the first load-sensing pin and the second load-sensing pin; and
    determine a horizontal load condition of the hitch based on data from the second load-sensing pin.

11. The apparatus as defined in claim 9, wherein the hitch pin signal analyzer determines the load condition based on a configuration of the first load-sensing pin and the second load-sensing pin, the configuration causing the load condition to be statically determinate.

12. The apparatus as defined in claim 11, wherein the configuration includes the first load-sensing pin and the second load-sensing pin at substantially the same vertical position relative to the receiver tube.

13. The apparatus as defined in claim 8, wherein the alert threshold corresponds to an improper load condition.

14. The apparatus of claim 8, wherein the receiver tube is configured to receive a trailer hitch arm along an axis, the first load-sensing pin and the second load-sensing pin disposed above the axis.

15. A method, comprising:
    receiving load data from a first load-sensing pin and a second load-sensing pin, the first load-sensing pin and the second load-sensing pin are operatively coupled to a receiver tube of a hitch of a vehicle, the first load-sensing pin and the second load-sensing pin coupled to a pin adapter that is the only load path between the first and second load-sensing pins and the receiver tube;

determining a load condition of the hitch based on the load data;

when the load condition satisfies an alert threshold, generating an alert; and presenting at least one of the load condition or the alert to a user.

16. The method as defined in claim 15, wherein the pin adapter is shaped such that the pin adapter does not contact a horizontal surface of the first load-sensing pin.

17. The method as defined in claim 15, further including:

determining a vertical load condition of the hitch based on data from the first load-sensing pin and the second load-sensing pin; and determining a horizontal load condition of the hitch based on data from the second load-sensing pin.

18. The method as defined in claim 15, wherein the determination of the load condition is based on a configuration of the first load-sensing pin and the second load-sensing pin, the configuration causing the load condition to be statically determinate.

19. The method as defined in claim 18, wherein the configuration includes the first load-sensing pin and the second load-sensing pin at substantially the same vertical position relative to the receiver tube.

20. The method of claim 15, wherein the pin adapter is disposed on a top surface of the receiver tube.

* * * * *